US009108587B2

United States Patent
Rickenbach et al.

(10) Patent No.: US 9,108,587 B2
(45) Date of Patent: Aug. 18, 2015

(54) 3-LAYER "C" SHAPED SIDE AIRBAG

(71) Applicant: Autoliv ASP, Inc., Ogden, UT (US)

(72) Inventors: Roger Rickenbach, Farr West, UT (US); Terry A. Wheelwright, Morgan, UT (US); Don Parker, Layton, UT (US); Andy Holliday, Ogden, UT (US); Megan Donahue, North Salt Lake, UT (US)

(73) Assignee: Autoliv ASP, Inc., Ogden, UT (US)

( * ) Notice: Subject to any disclaimer, the term of this patent is extended or adjusted under 35 U.S.C. 154(b) by 45 days.

(21) Appl. No.: 14/049,110

(22) Filed: Oct. 8, 2013

(65) Prior Publication Data
US 2015/0097359 A1    Apr. 9, 2015

(51) Int. Cl.
*B60R 21/233* (2006.01)
*B60R 21/207* (2006.01)
*B60R 21/231* (2011.01)

(52) U.S. Cl.
CPC ......... *B60R 21/23138* (2013.01); *B60R 21/231* (2013.01); *B60R 21/233* (2013.01); *B60R 2021/23146* (2013.01); *B60R 2021/23308* (2013.01); *B60R 2021/23324* (2013.01)

(58) Field of Classification Search
CPC ............... B60R 21/207; B60R 21/233; B60R 2021/23324; B60R 2021/23146; B60R 2021/23308
USPC ...................................... 280/730.2, 729, 740
See application file for complete search history.

(56) References Cited

U.S. PATENT DOCUMENTS

| | | |
|---|---|---|
| 5,324,072 A | 6/1994 | Olson et al. |
| 5,556,128 A | 9/1996 | Sinnhuber et al. |
| 5,573,270 A | 11/1996 | Sogi et al. |
| 5,586,782 A | 12/1996 | Zimmerman, II et al. |
| 5,803,485 A | 9/1998 | Acker et al. |
| 5,944,342 A | 8/1999 | White, Jr. et al. |
| 6,270,113 B1 | 8/2001 | Wipasuramonton et al. |
| 6,279,944 B1 | 8/2001 | Wipasuramonton et al. |
| 6,302,433 B1 | 10/2001 | Ellerbrok et al. |
| 6,349,964 B1 | 2/2002 | Acker et al. |
| 6,447,003 B1 | 9/2002 | Wallentin et al. |
| 7,021,652 B2 | 4/2006 | Kumagai et al. |
| 7,048,300 B2 | 5/2006 | Honda et al. |
| 7,063,350 B2 | 6/2006 | Steimke et al. |
| 7,152,876 B2 | 12/2006 | Hofmann |
| 7,195,280 B2 | 3/2007 | Wheelwright et al. |
| 7,198,288 B2 * | 4/2007 | Kim et al. .................. 280/730.2 |
| 7,316,415 B2 | 1/2008 | Jamison |

(Continued)

FOREIGN PATENT DOCUMENTS

WO    WO 2011/043855    4/2011

*Primary Examiner* — Ruth Ilan
(74) *Attorney, Agent, or Firm* — Madson IP, P.C.

(57) ABSTRACT

An airbag assembly may include an airbag with a first fabric panel, a second fabric panel attached to the first fabric panel, and a third fabric panel attached to the second fabric panel. The first and second fabric panels may define a first inflatable cushion and the second and third fabric panels may define a C-shaped second inflatable cushion. Upon deployment, the first inflatable cushion may have a first pressure and the second inflatable cushion may have a second pressure greater than the first pressure. Further, the first inflatable cushion may be positioned directly outboard of the thoracic region and the second inflatable cushion may be positioned directly outboard of the acromial region and the coxal region, but not the thoracic region, to provide gentler cushioning for the thoracic region.

18 Claims, 8 Drawing Sheets

(56) References Cited

U.S. PATENT DOCUMENTS

| | | |
|---|---|---|
| 7,347,444 B2 | 3/2008 | Wheelwright |
| 7,357,411 B2 | 4/2008 | Kurimoto et al. |
| 7,396,042 B2 | 7/2008 | Mabuchi et al. |
| 7,431,329 B2 | 10/2008 | Taguchi et al. |
| 7,497,468 B2 | 3/2009 | Choi et al. |
| 7,597,351 B2 | 10/2009 | Kashiwagi |
| 7,607,682 B2 | 10/2009 | Kurimoto et al. |
| 7,611,164 B2 | 11/2009 | Kai et al. |
| 7,699,340 B2 | 4/2010 | Okuhara et al. |
| 8,448,981 B2 * | 5/2013 | Fukawatase ............... 280/730.2 |
| 2004/0232666 A1 | 11/2004 | Sato et al. |
| 2005/0189742 A1 * | 9/2005 | Kumagai et al. ........... 280/730.2 |
| 2006/0022439 A1 * | 2/2006 | Bayley et al. ................ 280/729 |
| 2006/0108777 A1 | 5/2006 | Mabuchi et al. |
| 2009/0020987 A1 * | 1/2009 | Wipasuramonton et al. . 280/729 |
| 2012/0181780 A1 | 7/2012 | Rickenbach et al. |
| 2013/0229003 A1 * | 9/2013 | Fukawatase et al. ...... 280/730.2 |

\* cited by examiner

3-LAYER "C" SHAPED SIDE AIRBAG

TECHNICAL FIELD

The present invention relates to automotive safety. More specifically, the present invention relates to inflatable airbag systems and methods that provide enhanced protection for collisions such as side impact collisions and rollovers.

BACKGROUND

Inflatable safety restraint devices, or airbags, are mandatory on most new vehicles. Airbags are typically installed as part of a system with an airbag module in the steering wheel on the driver's side of car, and in the dashboard on the passenger side of a car. In the event of an accident, a sensor within the vehicle measures abnormal deceleration and triggers the ignition of a charge contained within an inflator. Expanding gases from the charge travel through conduits and fill the airbags, which immediately inflate in front of, or adjacent to, the driver and passenger to protect them from harmful impact with the interior of the car. Typically, airbags are concealed within the vehicle trim to be invisible during normal vehicle operation.

Recent safety standards issued by various governments require more comprehensive protection in the event of a side or frontal collision. Additionally, there is an ongoing need to provide airbag systems that are economical to manufacture and install, avoid interference with the ability of the automaker to position various features on the vehicle interior, and can be expected to deploy reliably. The passengers of a vehicle may be at any of a wide variety of positions within the vehicle at the time of deployment, so it is desirable to provide airbag systems that protect against impact over the broadest possible range of occupant locations.

Additional airbag systems, such as inflatable curtains and seat-mounted airbags have also been developed in response to the need for similar protection from lateral impacts between a passenger and the side of a vehicle's interior. This need might arise when another vehicle collides with the side of the car, or in a rollover situation in which the side of car is repeatedly impacting the ground. Inflatable curtain airbags are often stowed along the roof rail where the vehicle roof meets the side windows and pillars or within an outboard compartment of a vehicle seat. Other side impact airbag systems are stowed within a compartment located within the vehicle seat.

For any type of airbag including inflatable curtain and side impact airbags, one of the largest challenges is to provide the appropriate rigidity of the deployed cushion. The pressure of inflation gas within the deployed cushion may determine the rigidity of the cushion. A cushion that is not rigid enough may risk injury as the occupant's body part fully compresses the cushion to impact the vehicle surface behind the cushion. A cushion that is too rigid could cause injury as the person's body part impacts the cushion itself.

A complicating factor is that different parts of the body have different levels of mass and rigidity. A more massive part of the body will require greater cushion stiffness to avoid impact of the body part with the vehicle surface. Similarly, a more rigid part of the body (such as a bony area) may also tend to require greater cushion rigidity as there is a greater likelihood that a rigid body part will press excessively against the adjoining portion of the cushion, and thereby impact the vehicle surface behind the cushion. This "strikethrough" may occur when the internal pressure of the airbag is insufficient to prevent the colliding occupant from passing through the total depth of the airbag and contacting the hard interior surface of the vehicle.

SUMMARY OF THE INVENTION

The various systems and methods of the present invention have been developed in response to the present state of the art, and in particular, in response to the problems and needs in the art that have not yet been fully solved by currently available airbag systems and methods. Overall, this disclosure provides airbag systems and methods that provide reliable yet relatively gentle protection for vehicle occupants in a wide variety of collision situations including side impact and rollover situations. Further, the invention of this disclosure may minimize manufacturing and installation costs. The invention also may have other benefits that are not specifically set forth but are suggested herein.

In order to achieve maximum protection of a vehicle occupant in response to a lateral collision or rollover event, various parts of the body require different levels of impact protection. For example, it is advantageous for a seat-mounted side impact airbag to deploy such that the airbag applies a lower amount of pressure around the occupant's thoracic region, which is particularly susceptible to fracture, and a higher amount of pressure to the occupants acromial and coxal regions, to ensure that the occupant does not strikethrough and collide with the firm interior surface of the vehicle.

To achieve the foregoing, and in accordance with the invention as embodied and broadly described herein, an airbag assembly may have an airbag with a stowed configuration in which the airbag is compacted proximate an outboard side of a seat of a vehicle and a deployed configuration in which the airbag is positioned to protect an occupant of the seat from lateral impact. The occupant may have an acromial region, a thoracic region, and a coxal region. The airbag may have a first fabric panel, a second fabric panel attached to the first fabric panel, and a third fabric panel attached to the second fabric panel. The first and second fabric panels may define a first inflatable cushion and the second and third fabric panels may define a second inflatable cushion. The airbag assembly may also have an inflator positioned at least partially within the airbag to deliver inflation gas to the first and second inflatable cushions. In response to delivery of the inflation gas, the airbag may transition from the stowed configuration to the deployed configuration. In the deployed configuration, in response to impingement of the occupant against the airbag, the first inflatable cushion may have a first pressure and the second inflatable cushion may have a second pressure greater than the first pressure. In the deployed configuration, the first inflatable cushion may be positioned directly outboard of the thoracic region. The second inflatable cushion may have a C-shape such that, in the deployed configuration, the second inflatable cushion is positioned directly outboard of the acromial region and the coxal region, but not the thoracic region.

The airbag assembly may further have an inflator adapter tube coupled to the inflator to control inflation gas flow into the second inflatable cushion, and a valve coupled to the inflator adapter tube to restrict gas flow from the second inflatable cushion to the first inflatable cushion. The inflator adapter tube may have a first end secured to the second fabric panel and a second end defining a gas delivery port disposed within the second inflatable cushion. During deployment, the gas delivery port may be oriented toward an end region of the C-shape to expedite inflation gas flow into the end region.

In the deployed configuration, the first inflatable cushion may be further positioned directly outboard of the acromial region and the coxal region. The C-shape may have a top end region positioned directly outboard of the acromial region and a bottom end region positioned directly outboard of the coxal region.

The first fabric panel and the second fabric panel may be stitched together along a generally C-shaped seam that defines a portion of the C-shape. The assembly may further have a diffuser within the first inflatable cushion. The diffuser may have a central portion positioned between the inflator and the C-shaped seam to redirect gas flow from the inflator around the C-shaped seam. The diffuser may have a first opening that directs inflation gas toward a top end region of the first inflatable cushion and a second opening that directs inflation gas toward a bottom end region of the first inflatable cushion.

According to one method for inflating an airbag disposed in a vehicle seat having an occupant, the occupant may have an acromial region, a thoracic region and a coxal region. The method may include delivering inflation gas into the airbag from an inflator. The airbag may have a first fabric panel, a second fabric panel attached to the first fabric panel, and a third fabric panel attached to the second fabric panel. The first and second panels may define a first inflatable cushion. The second and third panels may define a second inflatable cushion. The second inflatable cushion may have a C-shape. The method may further include, in response to delivery of the inflation gas into the airbag, transitioning the airbag from a stowed configuration to a deployed configuration, which may include expanding the first inflatable cushion such that the first inflatable cushion is positioned directly outboard of the thoracic region and expanding the second inflatable cushion such that the second inflatable cushion is positioned directly outboard of the acromial region and the coxal region, but not the thoracic region. In the deployed configuration, in response to impingement of the occupant against the airbag, the second inflatable cushion may have a second pressure higher than a first pressure of the first inflatable cushion.

Delivering inflation gas into the airbag may further include passing the inflation gas through an inflator adapter tube within which the inflator is at least partially positioned to control inflation gas flow into the second inflatable cushion, and passing the inflation gas through a valve coupled to the inflator adapter tube to restrict gas flow from the second inflatable cushion to the first inflatable cushion. The inflator adapter tube may have a first end secured to the second fabric panel and a second end defining a gas delivery port disposed within the second inflatable cushion. Expanding the second inflatable cushion may include orienting the gas delivery port to direct inflation gas into an end region of the C-shape.

Transitioning the airbag from the stowed configuration to the deployed configuration may further include positioning the first inflatable cushion directly outboard of the acromial region and the coxal region, positioning a top end region of the C-shape directly outboard of the acromial region, and positioning a bottom end region of the C-shape directly outboard of the coxal region.

The first fabric panel and the second fabric panel may be stitched together along a generally C-shaped seam that defines a portion of the C-shape. Delivering inflation gas into the airbag may further include passing the inflation gas through a diffuser with a central portion positioned between the inflator and the C-shaped seam to redirect gas flow from the inflator around the C-shaped seam. Passing the inflation gas through the diffuser may include passing the inflation gas through a first opening of the diffuser that directs inflation gas toward a top end region of the first inflatable cushion and a second opening of the diffuser that directs inflation gas toward a bottom end region of the first inflatable cushion.

An airbag assembly according to the invention may have an airbag with a stowed configuration in which the airbag is compacted proximate an outboard side of a seat of a vehicle and a deployed configuration in which the airbag is positioned to protect an occupant of the seat from lateral impact. The occupant may have an acromial region, a thoracic region, and a coxal region. The airbag may have a first fabric panel, a second fabric panel attached to the first fabric panel, and a third fabric panel attached to the second fabric panel via a C-shaped seam. The second fabric panel may have an aperture. The first and second fabric panels may define a first inflatable cushion, and the second and third fabric panels may define a second inflatable cushion having a C-shape defined by the C-shaped seam. The airbag assembly may further include an inflator positioned at least partially within the airbag to deliver inflation gas to the first and second inflatable cushions, an inflator adaptor tube, within which the inflator is at least partially positioned, with a first end positioned to receive inflation gas through the aperture and a second end defining a gas delivery port positioned within the second inflatable cushion, a valve coupled to the inflator adapter tube to restrict gas flow from the second inflatable cushion to the first inflatable cushion, and a diffuser within the first inflatable cushion, wherein the diffuser has a central portion positioned between the inflator and the C-shaped seam to redirect gas flow from the inflator around the C-shaped seam. In response to delivery of the inflation gas, the airbag may transition from the stowed configuration to the deployed configuration. In the deployed configuration, the first inflatable cushion may have a first pressure and the second inflatable cushion may have a second pressure greater than the first pressure. In the deployed configuration, the first inflatable cushion may be positioned outboard of the thoracic region. The second inflatable cushion may have a C-shape such that, in the deployed configuration, the second inflatable cushion is positioned directly outboard of the acromial region and the coxal region, but not the thoracic region.

The C-shape may have a top end region positioned directly outboard of the acromial region and a bottom end region positioned directly outboard of the coxal region. The gas delivery port may be oriented toward the bottom end region of the C-shape to expedite inflation gas flow into the bottom end region.

In the deployed configuration, the first inflatable cushion may further be positioned directly outboard of the acromial region and the coxal region. The diffuser may have a first opening that directs inflation gas toward a top end region of the first inflatable cushion and a second opening that directs inflation gas toward a bottom end region of the first inflatable cushion.

The inflator may have a top portion, a bottom portion, and a central portion encircled by the aperture. The top portion may be positioned within the diffuser and the bottom portion may be positioned within the adapter tube.

These and other features and advantages of the present invention will become more fully apparent from the following description and appended claims, or may be learned by the practice of the invention as set forth hereinafter.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

Figure 1:
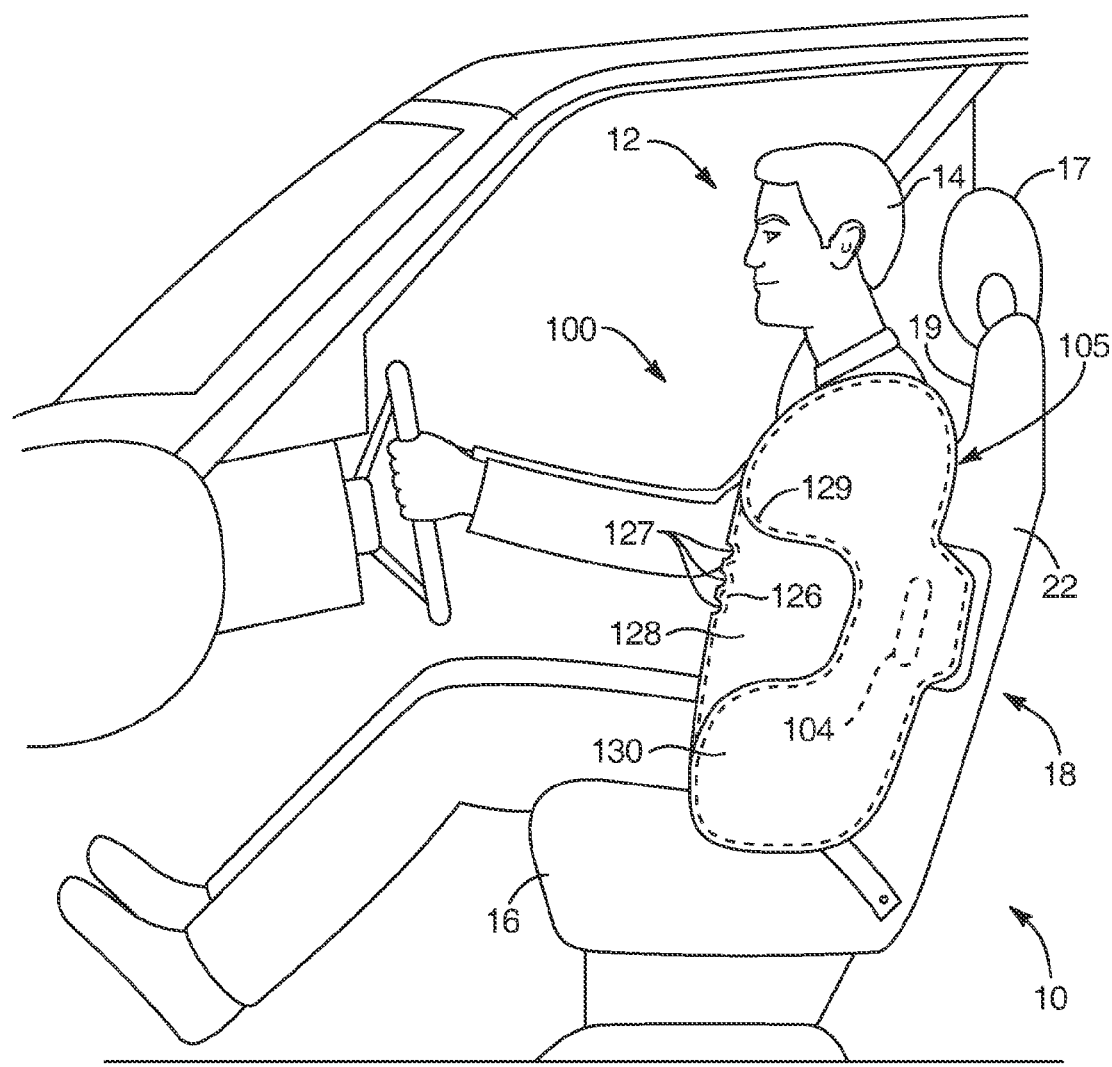
FIG. 1 is a side elevation view of an airbag assembly in a deployed configuration within a vehicle according to one embodiment of the invention.
Figure 1:
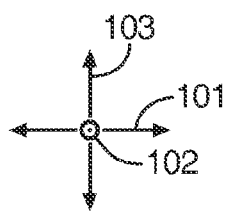

Exemplary embodiments of the invention will be best understood by reference to the drawings, wherein like parts are designated by like numerals throughout. It will be readily understood that the components of the invention, as generally described and illustrated in the Figures herein, could be arranged and designed in a wide variety of different configurations. Thus, the following more detailed description of the embodiments of the apparatus, system, and method, as represented in FIGS. 1 through 8, is not intended to limit the scope of the invention, as claimed, but is merely representative of exemplary embodiments of the invention.

The phrases "connected to," "coupled to" and "in communication with" refer to any form of interaction between two or more entities, including mechanical, electrical, magnetic, electromagnetic, fluid, and thermal interaction. Two components may be functionally coupled to each other even though they are not in direct contact with each other. The term "abutting" refers to items that are in direct physical contact with each other, although the items may not necessarily be attached together. The phrase "fluid communication" refers to two features that are connected such that a fluid within one feature is able to pass into the other feature.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to any airbag type.

Referring to FIGS. 1-5, an example of a side impact airbag system is described. An airbag assembly 100 may be used to protect the occupant 12 of a vehicle during a lateral or rollover collision. The vehicle may have a longitudinal direction 101 oriented along the length of the vehicle, a lateral direction 102 oriented from one side of the vehicle to the opposing side, e.g., into and out of the page in the view of FIG. 1, and a transverse direction 103 oriented upward and downward. The terms "inboard" and "outboard" may be used to refer to the relative position of an object along the lateral direction 102. "Outboard" relates to placement of an object relatively closer than a second object to a lateral plane of the vehicle, which is either of two planes perpendicular to the lateral direction 102, one of which barely touches the very leftward terminus of the vehicle, and the other of which barely touches the very rightward terminus of the vehicle. "Inboard" relates to placement of an object relatively closer than a second object to a medial plane of the vehicle, which is the plane perpendicular to the lateral direction 102 that bisects the vehicle into two generally (but not precisely) symmetrical halves.

"Inboard" and "outboard" do not require alignment of the two objects in the lateral direction 102; rather, these terms simply relate to proximity to the lateral or medial planes as set forth above. However, an object that is "directly outboard" of a second object is outboard of the second object, as defined above, and is further aligned with the second object along the lateral direction 102. Similarly, an object that is "directly inboard" of a second object is inboard of the second object, as defined above, and is further aligned with the second object along the lateral direction 102. Thus, objects that are "directly inboard" or "directly outboard" of each other are generally aligned laterally; hence, relative motion between the objects is needed only along the lateral direction 102, and not along the longitudinal direction 101 or the transverse direction 103, in order to bring the objects together.

The terms "rearward" and "forward" relate to the relative positions of the objects along the longitudinal direction 101. "Forward" relates to placement of an object relatively closer than a second object to a frontal plane of the vehicle, which is a plane perpendicular to the longitudinal direction 101 that barely touches the very frontward terminus of the vehicle. Similarly, "rearward" relates to placement of an object relatively closer than another object to a rear plane of the vehicle, which is a plane perpendicular to the longitudinal direction 101 that barely touches the very rearward terminus of the vehicle. An object that is "forward" of a second object need not be aligned with the second object in the longitudinal direction 101; it simply means that the first object is closer to the frontal plane of the vehicle than the second object. The term "rearward" similarly does not require alignment in the longitudinal direction 101.

The term "lateral" refers to a direction, object, or surface that pertains to the lateral direction 102. The "lateral surfaces" of the vehicle are the interior surfaces of the vehicle that face generally (but not necessarily precisely) toward the medial plane of the vehicle.

Figure 2:
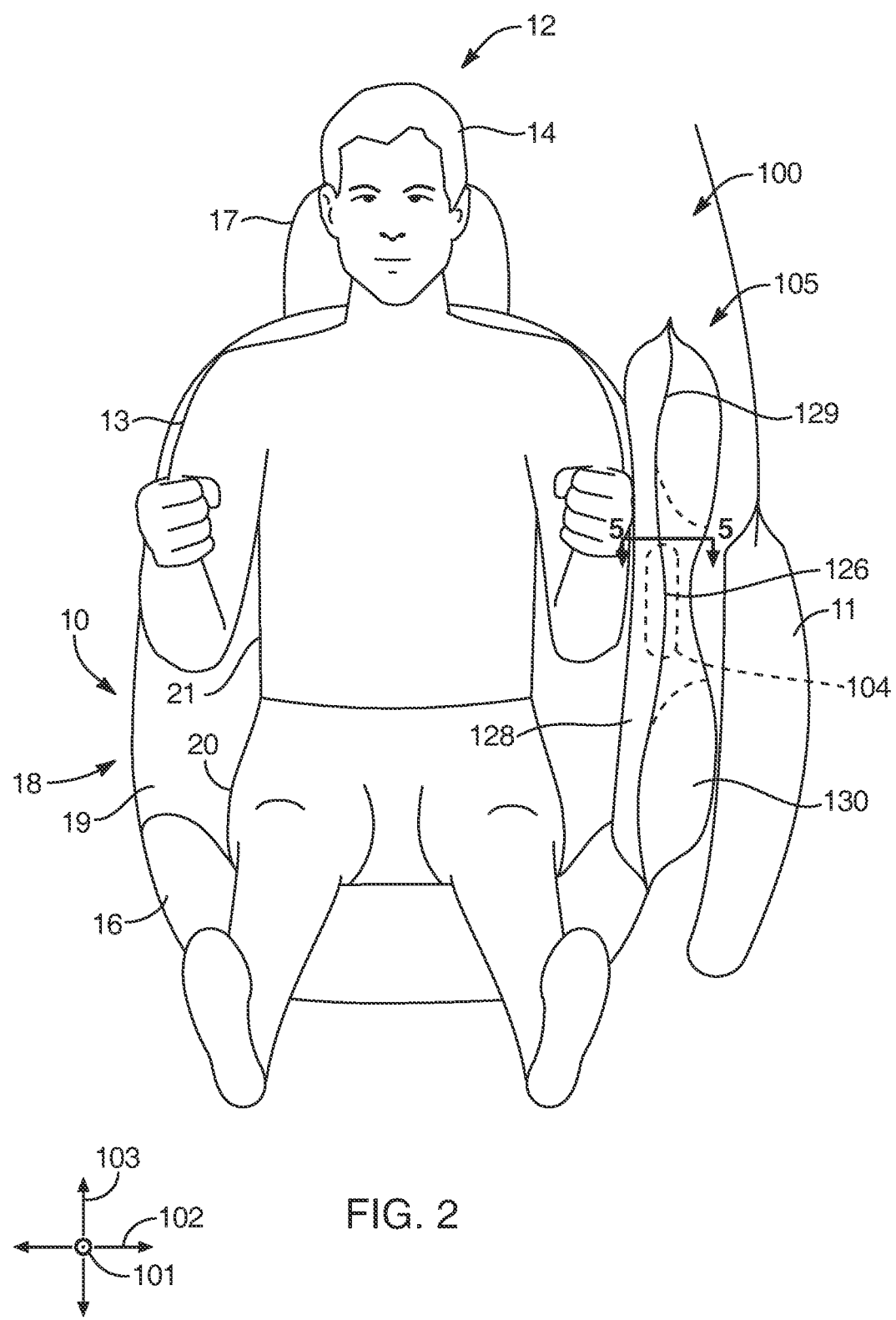
FIG. 2 is a front elevation view of the airbag assembly of FIG. 1, in the deployed configuration adjacent to a vehicle occupant.

FIGS. 1 and 2 illustrate an example of a vehicle seat 10 that is disposed at a predetermined distance from the interior side (e.g., inboard-facing lateral surface) of a vehicle door 11. The vehicle seat 10 may include a seat cushion 16, a seat back 18 and a headrest 17. The seat back 18 may include a forward facing surface 19. The vehicle seat 10 may further include an outboard side 22. The outboard side 22 may intersect the forward facing surface 19 of the seat back 18 and may extend between the headrest 17 and the seat cushion 16. An occupant 12 of the vehicle is illustrated sitting on the vehicle seat 10 such that the cephalic region 14 of the occupant 12 is close to or in contact with the headrest 17. The occupant 12 also has an acromial region 13, a thoracic region 21 that is close to or in contact with forward facing surface 19, and a coxal region 20 that may be near or in contact with the seat cushion 16.

Figure 3:
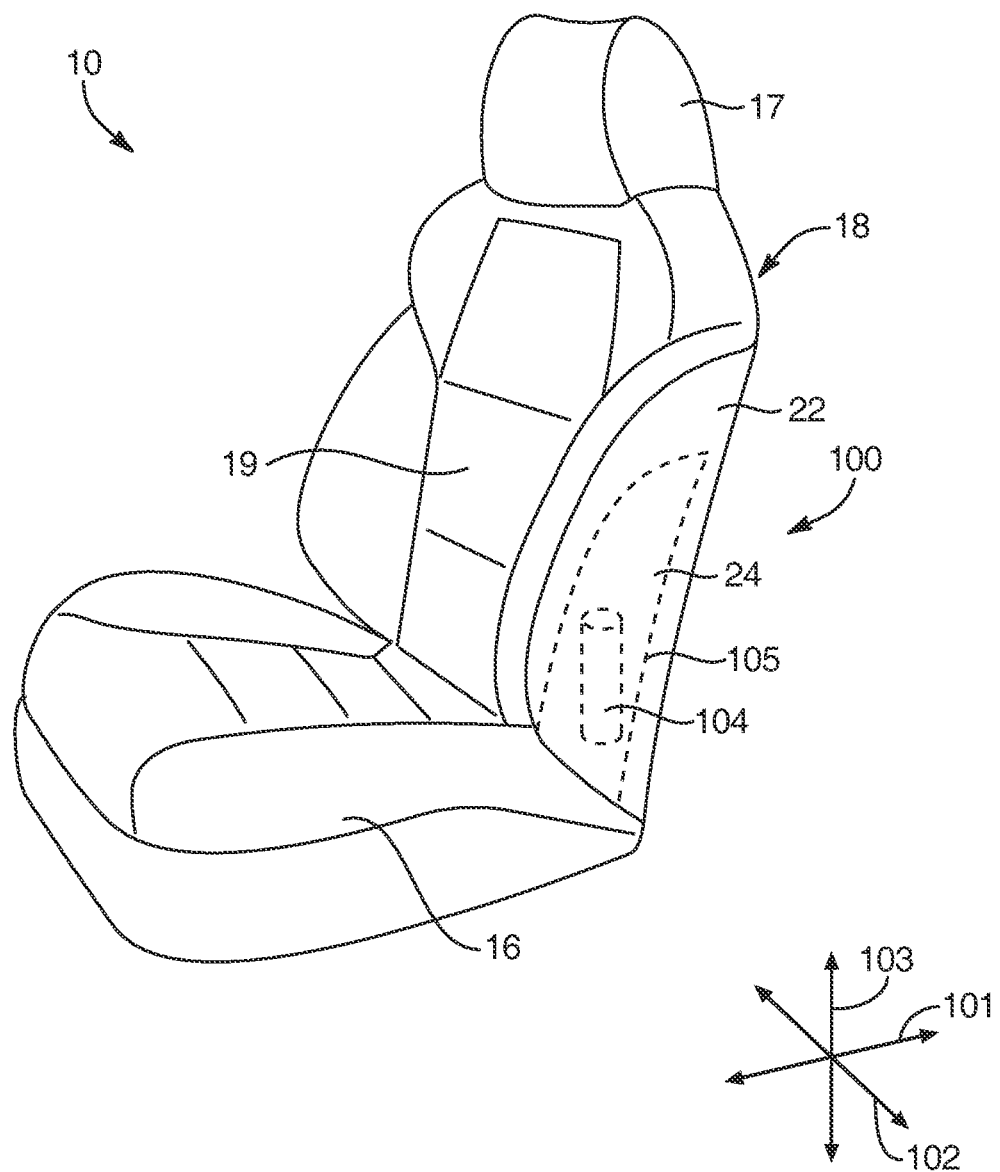
FIG. 3 is a perspective view of a vehicle seat with the airbag assembly of FIG. 1 in a stowed configuration.

The airbag 105 may normally reside in a stowed, or non-deployed configuration, as illustrated in FIG. 3. When the airbag assembly 100 is in the stowed configuration, the airbag assembly 100 may be concealed within a storage compartment 24, for example, within the seat back 18 on the outboard side 22. Prior to installation in the vehicle, the airbag 105 may be compacted into the stowed configuration by rolling, folding, or a combination thereof. Once compacted into the stowed configuration, the airbag 105 may be retained in the stowed configuration through the use of wrappers, fasteners, or the like to facilitate shipping and installation.

The airbag assembly 100 may include an inflator 104, which may be stored at any suitable location relative to the airbag 105. The airbag 105 may also have a sensor and a control system (not shown) that detects a collision or impending collision and transmits an activation signal to the inflator 104. The inflator 104 may be one of several types, such as pyrotechnic, stored gas, or a combination inflator and may be a single or multistage inflator. If the inflator 104 is a pyrotechnic inflator, the inflator 104 may contain a propellant that ignites to rapidly produce inflation gas in response to receipt of the activation signal.

In the event of a collision, the inflator 104 may be activated to generate and/or release inflation gas such that the inflation gas may rapidly enter the airbag 105, thereby causing the airbag 105 to begin expanding. Thus, the airbag 105 may exit the stowed configuration and assume an extended, or deployed, shape. This process is called "deployment." When deployment is complete, the airbag 105 may be said to be in a deployed configuration, as illustrated in FIGS. 1 and 2.

When the airbag assembly 100 is in the deployed configuration, at least a portion of the airbag 105 may extend outward from the storage compartment 24 such that the airbag 105 is positioned between the occupant 12 and the vehicle door 11. The airbag assembly 100 may be connected to the storage compartment 24, the vehicle seat 10, and/or any other feature of the vehicle via a tether or anchor (not shown) such that when the airbag assembly 100 deploys, the tether provides tension that helps keep the airbag 105 in place.

The airbag 105 may be generally formed from three panels of flexible material such as a fabric or thin polymer. For example, the inflatable airbag may be made from a woven nylon fabric, but other fabrics or flexible materials may be used. In other embodiments, the airbag 105 may include a different number of fabric panels, which may be folded, sewn, one-piece woven, or otherwise secured together according to methods known in the art.

Figure 4:
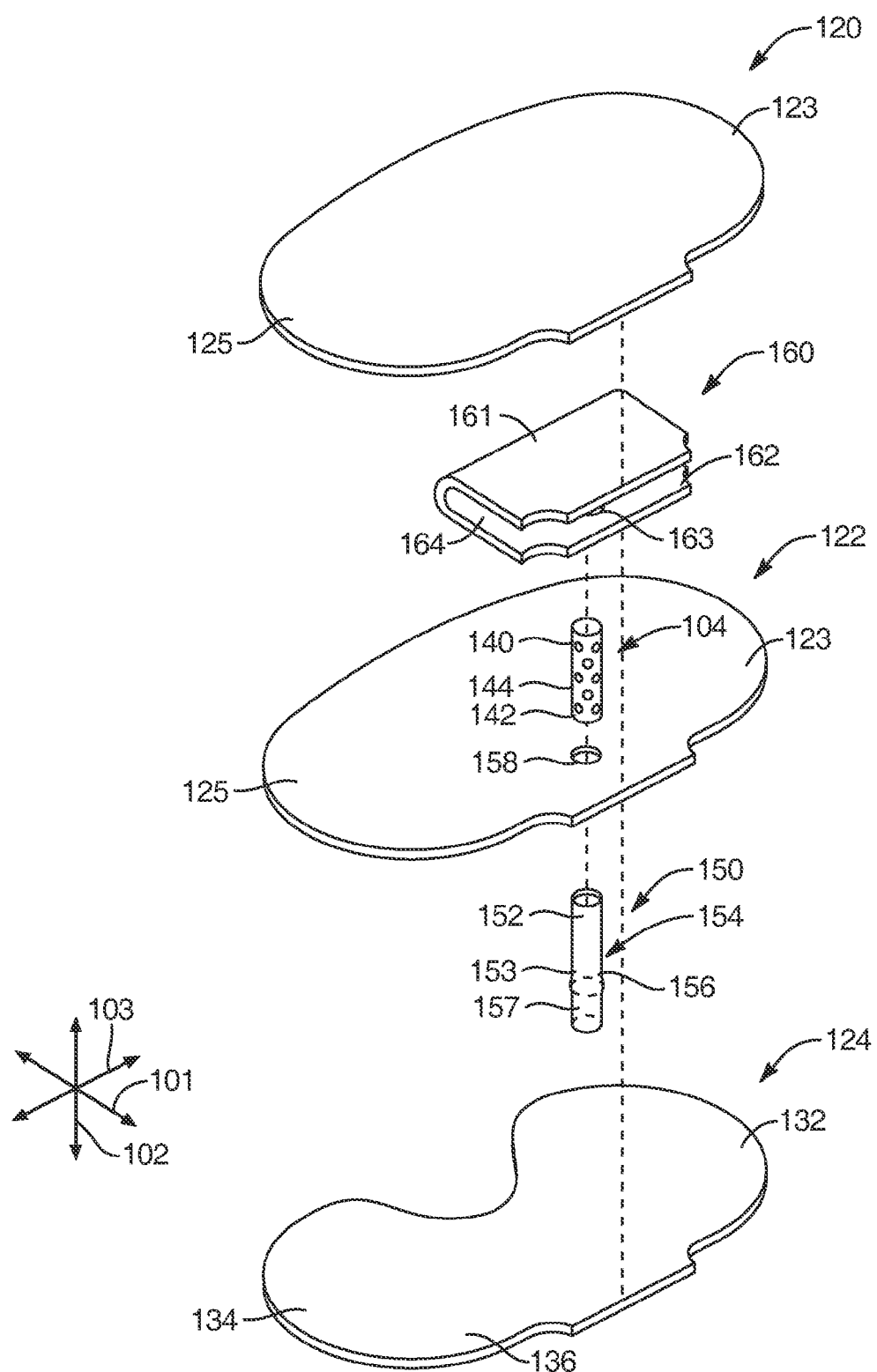
FIG. 4 is an exploded perspective view of the airbag assembly of FIG. 1.

As seen best in the exploded view of FIG. 4, the airbag may include a first fabric panel 120, a second fabric panel 122, and a third fabric panel 124. The first fabric panel 120 and the second fabric panel 122 may generally (although not necessarily exactly) be the same shape. The first fabric panel 120 and the second fabric panel 122 may be generally elliptically shaped with a first rounded end portion, which may also be referred to as a top end region 123, and a second rounded end portion, which may also be referred to as bottom end region 125. The bottom end region 125 may be opposite the top end region 123. In an alternative embodiment, the first fabric panel 120 and the second fabric panel 122 may be circular, polygonal or otherwise irregularly shaped. The third fabric panel 124 may be generally C-shaped or crescent shaped.

The first fabric panel 120 may be connected to the second fabric panel 122 by a first seam 126 (see FIGS. 1 and 2) that extends substantially along the periphery of the first fabric panel 120 and the second fabric panel 122. In alternative embodiments, the first fabric panel 120 may be secured to the second fabric panel 122 via mechanical fastening, adhesives, one-piece weaving, RF welding, ultrasonic welding, or any other suitable method known in the art. When the airbag 105 is inflated, the first fabric panel 120 and second fabric panel 122 may define a first and second wall of a first inflatable cushion 128. When the airbag 105 is in the deployed configuration, the first fabric panel 120 may be disposed outboard of the second fabric panel 122. Optionally, one or more vents 127 may be formed in the first inflatable cushion 128 to allow inflation gas to escape at a controlled rate so that, after the collision event is over, the airbag 105 will deflate.

When the airbag 105 is in the deployed configuration, the third fabric panel 124 may be positioned outboard of the second fabric panel 122, as best seen in FIG. 4. The third fabric panel 124 may be connected to the second fabric panel 122 along a second seam 129. The second seam 129 may extend substantially along the perimeter of the third fabric panel 124 to define a second inflatable cushion 130, which may be generally C-shaped, as best seen in FIG. 1. The second fabric panel 122 and the third fabric panel 124 may define the first and second walls of the second inflatable cushion 130.

In alternative embodiments, an airbag assembly (not shown) may have the positions of the first inflatable cushion 128 and the second inflatable cushion 130 reversed, for example, by positioning the first inflatable cushion 128 outboard of the second inflatable cushion 130. More precisely, the positions of the first fabric panel 120 and the third fabric panel 124 may be reversed to swap the positions of the first inflatable cushion 128 and the second inflatable cushion 130. Similarly, other components of the airbag assembly 100, such as the inflator 104 and related components, may be reversed in orientation and/or position to enable the alternative airbag assembly to function substantially as described herein in connection with the airbag assembly 100.

In other alternative embodiments, the first fabric panel 120, the second fabric panel 122, and the third fabric panel may be re-arranged to provide differently configured airbags. For example, if desired, the third fabric panel 124 may be positioned between the first fabric panel 120 and the second fabric panel 122. Such an arrangement may still result in a second inflatable cushion with a C-shape; however, the C-shaped fabric panel may be interior to the other two fabric panels, and thus may not be visible.

The second inflatable cushion 130 may include a top end region 132, a bottom end region 134 that is opposite the top end region 132, and a middle portion 136 that extends between the top end region 132 and the bottom end region 134. The top end region 132 and the bottom end region 134 may be positioned at the ends of the C-shape, i.e., the furthest extents of the C-shaped pathway generally followed by the second inflatable cushion 130. The third fabric panel 124 may be connected to the second fabric panel 122 such that the top end region 132 is positioned in alignment with the top end region 123 of the first inflatable cushion 128 and the bottom end region 134 is positioned in alignment with the bottom end region 125 of the first inflatable cushion 128.

FIG. 2 illustrates the airbag 105 in the deployed configuration from a frontal viewpoint, looking rearward. As shown, the airbag 105, in the deployed configuration, may be adjacent to and outboard of the occupant 12 of the vehicle. When the airbag 105 is in the deployed configuration, the first inflatable cushion 128 may be positioned outboard of the occupant 12 to cushion the acromial region 13, the thoracic region 21 and the coxal region 20 from impact against a lateral surface of the vehicle, such as the vehicle door 11. The second inflatable cushion 130 may be positioned outboard of the first inflatable cushion 128 such that the second inflatable cushion 130 provides further cushioning for the acromial region 13 and the coxal region 20, but not the thoracic region 21. Thus, the second inflatable cushion 130 may overlap a corresponding C-shaped portion of the first inflatable cushion 128 to provide dual-depth impact protection for the acromial region 13 and the coxal region 20.

When the airbag 105 is deployed, the first inflatable cushion 128 may be inflated to a first pressure and the second inflatable cushion 130 may be inflated to a second pressure. The first pressure may be generally lower than the second pressure. When the airbag 105 is deployed in response to a collision, the acromial region 13 and coxal region 20 may move laterally toward the vehicle door 11 and may receive cushioning from a portion of both the first inflatable cushion 128 and the second inflatable cushion 130. The thoracic region 21 may impact only a portion of the first inflatable cushion 128, without support from the second inflatable cushion 130.

The first inflatable cushion 128 and the second inflatable cushion 130 may inflate to pressures that are similar to or even substantially equal to each other in the deployed configuration, before the occupant 12 has begun to impact the airbag 105. However, as will be set forth subsequently, the second inflatable cushion 130 may be designed to retain inflation gas, thereby causing the second inflatable cushion 130 to increase significantly in pressure as the airbag 105 receives and cushions the body of the occupant 12.

The relatively lower pressure of the first inflatable cushion 128 may provide a softer cushioning for the thoracic region 21, thus reducing the risk of injury to the occupant's ribs and/or other sensitive areas of the thoracic region 21. The relatively high pressure of the second inflatable cushion 130 may support the low pressure of the first inflatable cushion 128 between the acromial region 13 and the coxal region 20 and the vehicle door 11 to provide more rigid cushioning than that provided to the thoracic region 21. Thus, the second inflatable cushion 130 may cooperate with the first inflatable cushion 128 to help prevent strikethrough of the heavier and more rigid portions of the acromial region 13 and the coxal region 20, such as the occupant's shoulder and hip. The overlap second inflatable cushion 130 may thus act to provide a redundant cushioning for the acromial region 13 and the coxal region 20, with a high pressure that helps to resist strikethrough.

Referring to FIGS. 4-8, the airbag assembly 100 may also include an inflator adapter tube 150. The inflator adapter tube 150 may be coupled to the inflator 104 to control inflation gas flow into the second inflatable cushion 130. The inflator adapter tube 150 may be formed of a body 154 with a first end 152 and a second end 153 in which a gas delivery port 156 is formed. The body 154 may be formed of a rigid material such as a metal, and may optionally be integrated with or secured to mounting hardware such as studs, bolts, or the like, which may be used to secure the body 154 to the vehicle seat 10. Alternatively, the body 154 may be made of a flexible material such as a woven fabric or polymer sheet.

The body 154 may have a generally tubular shape in the deployed configuration. In alternative embodiments (not shown), an adapter tube may have a tapered, flattened, curved, or other regular or irregular shape. The shape of the adapter tube may be adapted to the desired flow path of inflation gas into the second inflatable cushion. The inflator adapter tube 150 may optionally have a tubular shape with one or more holes formed in the side wall of the tubular shape to permit inflation gas to flow out of the inflator adapter tube 150 through holes other than at the ends of the inflator adapter tube 150.

Figure 6:
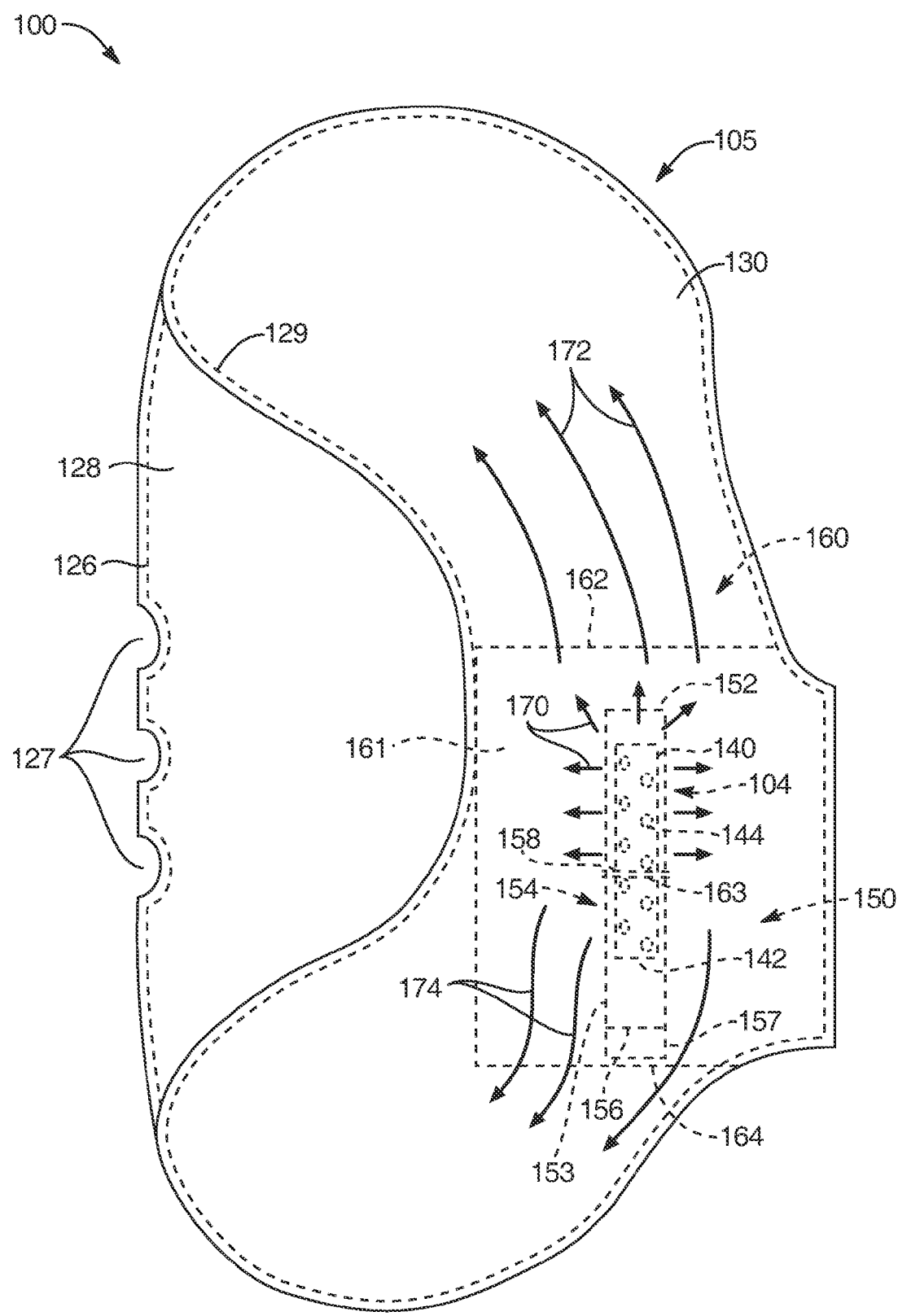
FIG. 6 is a side elevation view of the airbag assembly of FIG. 1, illustrating inflation gas flow into the first inflatable cushion.
Figure 7:
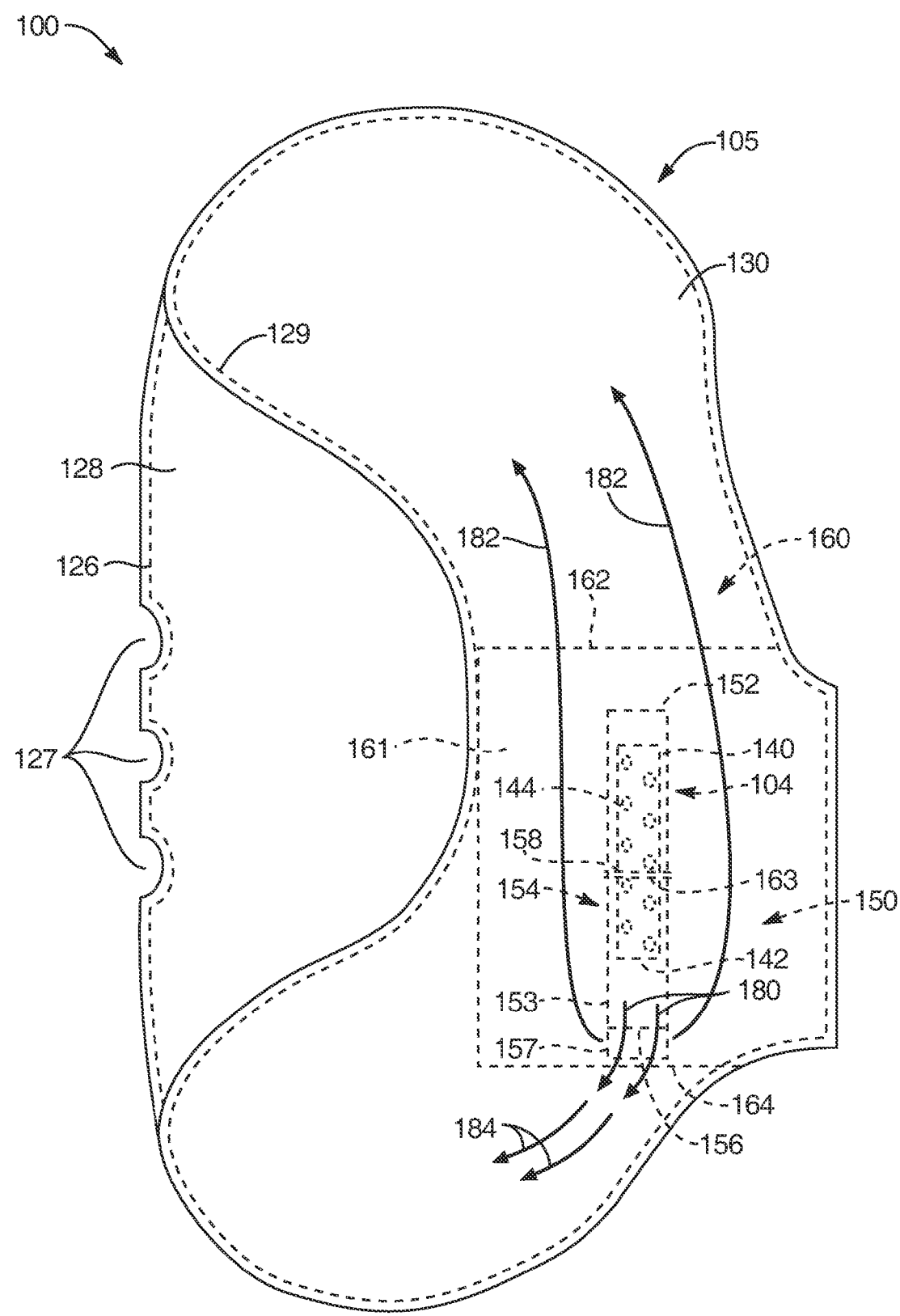
FIG. 7 is a side elevation view of the airbag assembly of FIG. 1, illustrating inflation gas flow into the second inflatable cushion.
Figure 8:
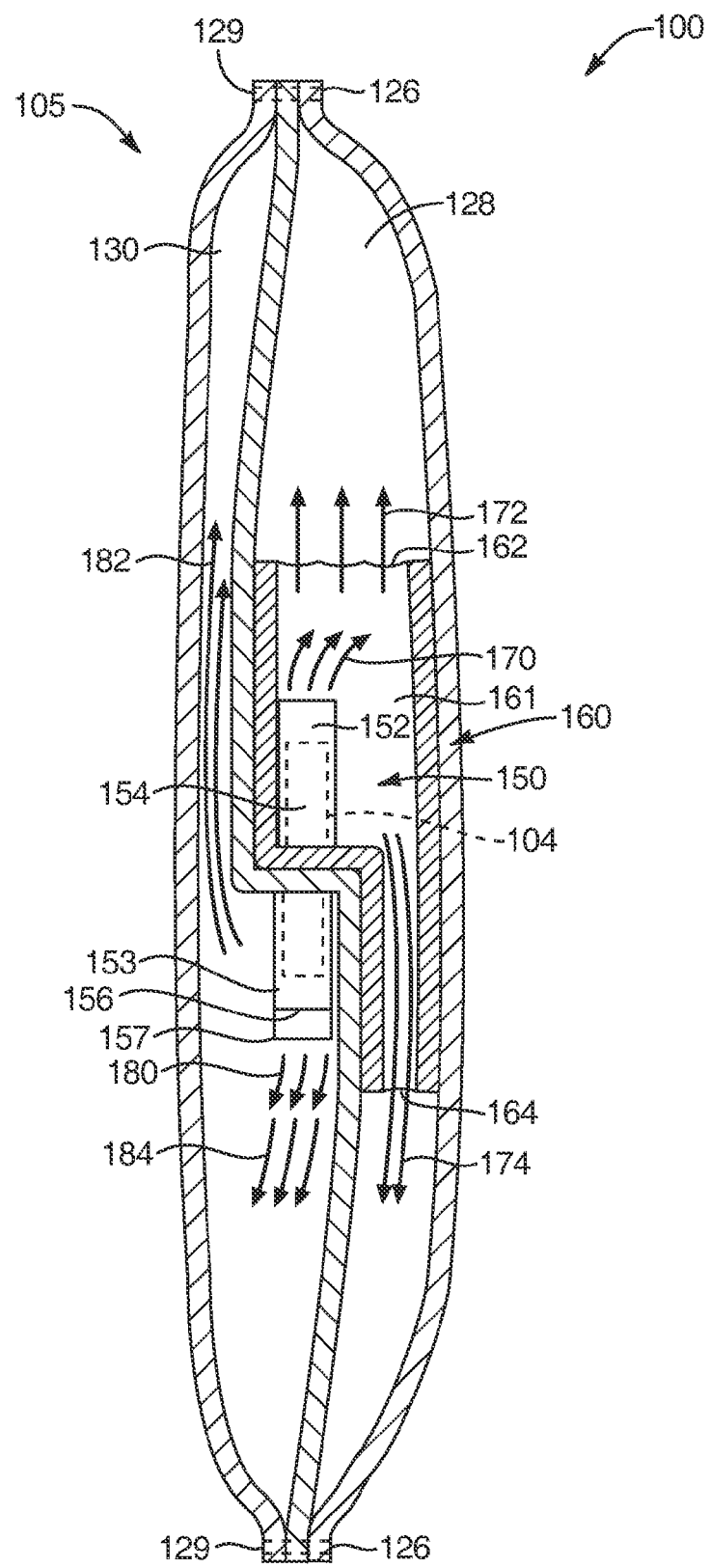
FIG. 8 is a rear elevation section view along line 8-8 of FIG. 5 of the airbag assembly of FIG. 1, illustrating inflation gas flow into the first and second inflatable cushions.

In the example illustrated in FIGS. 6, 7, and 8, the inflator adapter tube 150 includes a gas delivery port 156, and may optionally have additional gas delivery ports (not shown). The inflator adapter tube 150 may be secured to the second fabric panel 122 proximate an aperture 158 in the second fabric panel 122. The inflator adapter tube 150 may optionally be secured to the fabric surrounding the aperture 158 such that the gas delivery port 156 remains within the second inflatable cushion 130. The aperture 158 may encircle the inflator adapter tube 150 between the first end 152 and the second end 153 of the inflator adapter tube 150.

The inflator 104 may also have a first end 140, a second end 142, and an intermediate portion 144 between the first end 140 and the second end 142. The first end 140 may be oriented toward the top end region 123 of the first fabric panel 120 and the second fabric panel 122. The second end 142 may be oriented toward the bottom end region 125 of the first fabric panel 120 and the second fabric panel 122, and/or the bottom end region 134 of the third fabric panel 124. The intermediate portion 144 may be positioned within the aperture 158 such that the aperture 158 encircles the intermediate portion 144. Thus, the first end 140 may be positioned within the first inflatable cushion 128 while the second end 142 is positioned within the second inflatable cushion 130.

A valve 157 may be positioned adjacent to the inflator adapter tube 150. The valve 157 may be secured to the gas delivery port 156 of the inflator adapter tube 150 so that inflation gas must travel through the valve 157 in order to enter the second inflatable cushion 130 through the gas delivery port 156. The valve 157 may be designed to restrict flow of inflation gas from the second inflatable cushion 130 into the first inflatable cushion 128 by restricting the flow of inflation gas from the second inflatable cushion 130 back into the inflator adapter tube 150 through the gas delivery port 156. The valve 157 may optionally act as a check valve, and may open to permit gas flow into the second inflatable cushion 130, while closing to restrict and/or prevent gas flow from the second inflatable cushion 130.

The valve 157 may be any of a variety of known valve types. According to one embodiment, the valve 157 may take the form of a tube formed of a flexible material such as a fabric. The tube may remain in a substantially tubular shape when the second inflatable cushion 130 is at relatively low pressure, permitting relatively unimpeded passage of inflation gas into the second inflatable cushion 130 during inflation. However, when the pressure within the second inflatable cushion 130 is equal to or greater than that of the inflator adapter tube 150 and/or the first inflatable cushion 128, the tube of the valve 157 may collapse to restrict and/or prevent passage of inflation gas through the valve 157, back into the inflator adapter tube 150.

The valve 157 may cause the pressure of inflation gas within the second inflatable cushion 130 to increase during loading so that the pressure within the second inflatable cushion 130 is higher than that within the first inflatable cushion 128. More precisely, when the occupant 12 strikes the airbag 105 in the deployed configuration, the weight of the occupant 12 may press on the first inflatable cushion 128, thereby increasing the pressure of inflation gas within the first inflatable cushion 128. Some of the inflation gas may pass from the first inflatable cushion 128 to the second inflatable cushion 130 to equalize the pressure between the first inflatable cushion 128 and the second inflatable cushion 130. As the body of the occupant 12 continues to move into the airbag 105, it may more directly load the second inflatable cushion 130. However, due to the operation of the valve 157, inflation gas may be unable to pass from the second inflatable cushion 130 back to the first inflatable cushion 128. Thus, the pressure within the second inflatable cushion 130 may, at this time, be higher than that within the first inflatable cushion 128. Higher pressure within the second inflatable cushion 130 may provide more rigid cushioning for the heavier body parts of the occupant 12 such as the shoulder and hips, while the relatively lower pressure within the first inflatable cushion 128 may more gently cushion the abdomen of the occupant 12.

The airbag assembly 100 may also include a diffuser 160, as best illustrated in FIGS. 4-8. The diffuser 160 may be formed of a flexible material such as a fabric or a thin polymer sheet. In alternative embodiments (not shown), a diffuser may be integrated with one of the fabric panels of the airbag. However, as shown in FIG. 4, the diffuser 160 may be formed separately from the first fabric panel 120 or the second fabric panel 122.

The diffuser 160 may include a central portion 161 that is positioned between the inflator 104 and the C-shaped second seam 129. The diffuser 160 may include a first opening 162 that is disposed towards the top end region 123 of the first fabric panel 120 and the second fabric panel 122. The diffuser 160 may further include a second opening 164 that is disposed towards the bottom end region 125 of the first fabric panel 120 and the second fabric panel 122. The diffuser 160 may also include an aperture 163 aligned with the aperture 158 on the second panel to hold a portion of the inflator adapter tube 150.

The inflator adapter tube 150 may be positioned substantially parallel to the inflator 104, the first fabric panel 120, the second fabric panel 122, and the third fabric panel 124 after assembly has been completed. Thus, according to one example, the inflator 104 may be inserted into the inflator adapter tube 150, and then the inflator adapter tube 150 and the inflator 104 may be inserted through the aperture 158 and the aperture 163. Then, the inflator adapter tube 150 and the inflator 104 may be rotated parallel to the second fabric panel 122, causing the material surrounding the aperture 158 and the aperture 163 to flex, thereby positioning the aperture 158 and the aperture 163 generally perpendicular to the second fabric panel 122. The inflator adapter tube 150 may be secured in place, for example, by inserting mounting studs (not shown) of the inflator adapter tube 150 through corresponding holes (not shown) of the second fabric panel 122, the diffuser 160, and/or the third fabric panel 124. The first fabric panel 120, the second fabric panel 122, the third fabric panel 124, and the diffuser 160 may then be secured together.

Figure 5:
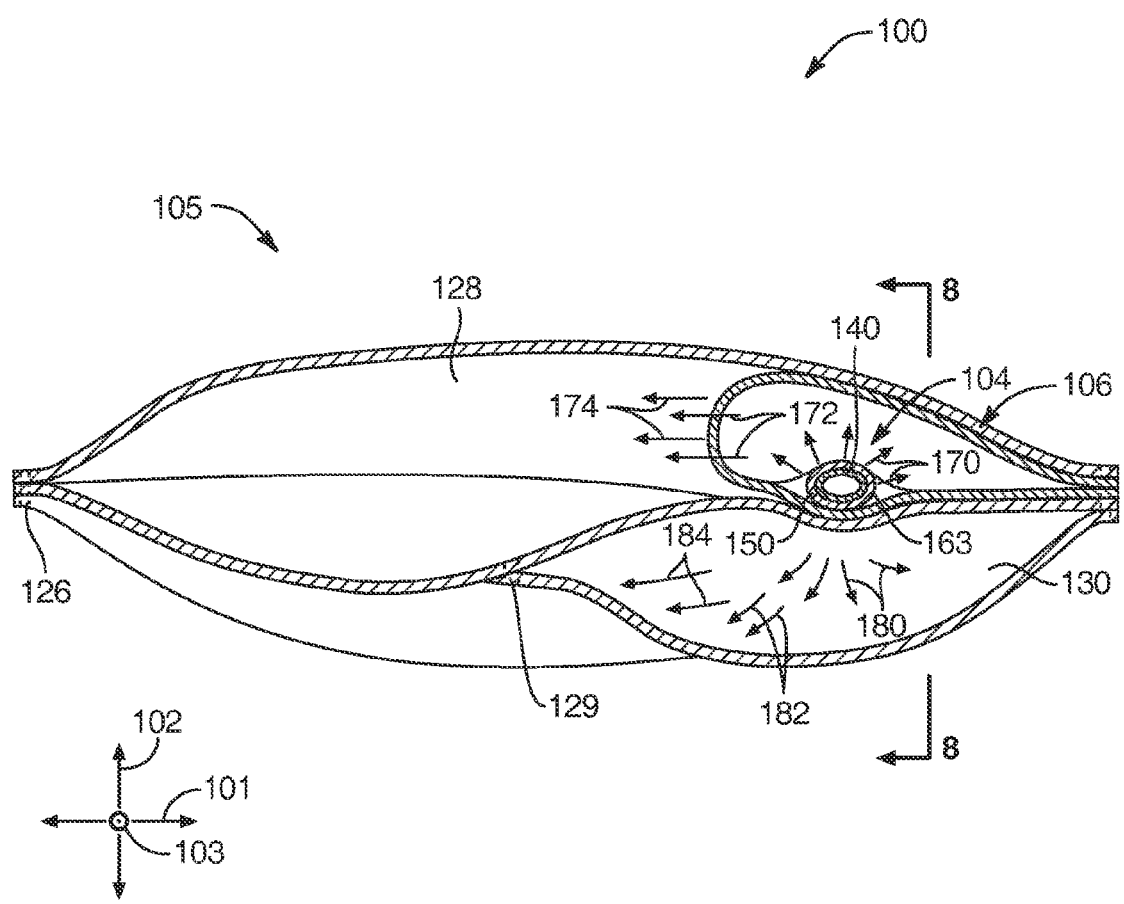
FIG. 5 is a top, cross sectional view along line 5-5 of FIG. 2 of the airbag assembly of FIGS. 1 and 2.

Referring to FIG. 5, an example of a gas flow pattern is shown within the first inflatable cushion 128 and the second inflatable cushion 130 along a cross sectional view of airbag 105, taken along the lines 5-5 illustrated in FIG. 2. The directions of the gas flow within the first inflatable cushion 128 are designated by the arrows 170, the arrows 172, and the arrows 174. The directions of gas flow within the second inflatable cushion 130 are designated by the arrows 180, the arrows 182, and the arrows 184.

As shown most clearly in FIG. 5, FIG. 6, and FIG. 8, the inflation gas may flow into the first inflatable cushion 128 from the inflator 104 as indicated by the arrows 170. Production of inflation gas by the inflator 104 may be triggered by detection of a collision or an impending collision. The inflation gas from the first end 140 of the inflator 104, which is disposed within the inflator adapter tube 150 and within the diffuser 160 within the first inflatable cushion 128, may enter the central portion 161 of the diffuser 160 from the inflator adapter tube 150, and may then be deflected away from direct impingement against the second seam 129. Thus, the diffuser 160 may act to protect the second seam 129 against the stresses that may otherwise be exerted upon it due to direct impingement of inflation gases.

From the central portion 161, the inflation gas may flow upward through the first opening 162 of the diffuser 160 to reach the top end region of the first inflatable cushion 128, which may be defined as the space between the top end region 123 of the first fabric panel 120 and the top end region 123 of the second fabric panel 122. From the central portion 161, the inflation gas may also flow downward through the second opening 164 of the diffuser 160 to reach the bottom end region of the first inflatable cushion 128, which may be defined as the space between the bottom end region 125 of the first fabric panel 120 and the bottom end region 125 of the second fabric panel 122. Thus, in addition to protecting the second seam 129, the diffuser 160 may act to expedite inflation of the top end region and the bottom end region of the first inflatable cushion 128.

As shown most clearly in FIG. 5, FIG. 7, and FIG. 8, the inflation gas may flow into the second inflatable cushion 130 from the inflator 104 as indicated by the arrows 180. The inflation gas may flow from the second end 142 of the inflator 104, which is positioned within the inflator adapter tube 150 in the second inflatable cushion 130, directly into the inflator adapter tube 150. From the inflator adapter tube 150, the inflation gas may flow generally downward and exit the inflator adapter tube 150 via the gas delivery port 156, as illustrated by the arrows 180. Thus, the inflation gas may enter the second inflatable cushion 130 flowing generally downward.

From the gas delivery port 156, the inflation gas may flow upward as illustrated by the arrows 182 to reach the top end portion of the second inflatable cushion 130, which may be defined as the space between the top end region 123 of the second fabric panel 122 and the top end region 132 of the third fabric panel 124. The inflation gas may also flow downward as illustrated by the arrows 184 to reach the bottom end portion of the second inflatable cushion 130, which may be defined as the space between the bottom end region 125 of the second fabric panel 122 and the bottom end region 134 of the third fabric panel 124. Thus, inflation gas flow may be expedited into the top and bottom end regions of the second inflatable cushion 130, and particularly, into the bottom end region of the second inflatable cushion 130, which will cushion the coxal region 20 of the occupant 12. The coxal region 20 may be the location of greatest bodily weight, and may thus require the greatest rigidity in cushioning; hence, expedited and/or higher pressure inflation of the bottom end region of the second inflatable cushion 130 may be desirable.

As mentioned previously, the second inflatable cushion 130 may be inflated to a higher pressure than the first inflatable cushion 128. This may be accomplished through any of a variety of features of the airbag 105. For example, the pressure differential may be achieved simply by virtue of the difference in volume between the first inflatable cushion 128 and the second inflatable cushion 130. The first inflatable cushion 128 may be significantly more voluminous than the second inflatable cushion 130; thus, the second inflatable cushion 130 may inflate to a higher pressure.

Additionally or alternatively, venting through the vents 127 may be used to release gas from the first inflatable cushion 128 during inflation, thus maintaining the first inflatable cushion 128 at a predetermined pressure limit. The size and placement of the vents 127 may be used to help control this pressure. If desired, the second inflatable cushion 130 may also be vented to permit the measured release of inflation gas into the first inflatable cushion 128, or directly into the vehicle interior.

Additionally or alternatively, the inflator 104 may be positioned to control the relative gas flow into the first inflatable cushion 128 and the second inflatable cushion 130. For example, if the aperture 158 and the aperture 163 are positioned to encircle the inflator 104 relatively closer to the first end 140 of the inflator 104, this may cause a larger portion of the length of the inflator 104 to be positioned within the second inflatable cushion 130. Thus, more gas may flow into the second inflatable cushion 130, causing the second inflatable cushion 130 to be inflated to a relatively higher pressure. Alternatively, relative flow may be adjusted by modifying the position of the inflator 104 within the inflator adapter tube 150.

In one embodiment, the second inflatable cushion 130 may inflate generally simultaneously with the first inflatable cushion 128. In another embodiment, the second inflatable cushion 130 may inflate after the first inflatable cushion 128 has partially, or fully inflated. Alternatively, the second inflatable cushion 130 may inflate prior to inflation of the first inflatable cushion 128. The order in which inflation occurs may be tuned to the likely timing of impact of the occupant 12 with the airbag 105. For example, if the acromial region 13 is expected to contact the airbag 105 first, prior to contact of the thoracic region 21 with the airbag 105, it may be desirable to expedite inflation of the second inflatable cushion 130 relative to inflation of the first inflatable cushion 128. Such tuning of the inflation timing should be understood from this disclosure by those skilled in the art.

The airbag assembly 100 is illustrated in connection with the driver's side of the vehicle, but those of skill in the art will recognize that the present invention may be readily adapted for protection of passengers of the front seat, middle seats, or rear seats in a vehicle. In addition to the airbag assembly 100, other airbags may be installed in the vehicle. For example, an additional separate driver's side airbag (not shown in FIG. 1) may be used to protect an occupant (i.e., the driver) from impact with various forward surfaces of the vehicle, including the steering wheel and instrument panel. Various other airbags such as passenger-side airbags, knee airbags, inflatable curtains, and the like may also be used in cooperation with an airbag assembly according to the present invention.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, Figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 Para. 6. It will be apparent to those having skill in the art that changes may be made to the details of the above-described embodiments without departing from the underlying principles of the invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. An airbag assembly for providing pressure-appropriate protection during a side impact collision generally for regions corresponding to an acromial region, a thoracic region, and a coxal region of an occupant seated in a vehicle seat having a seat cushion and seat back comprising:
   an airbag comprising a stowed configuration in which the airbag is compacted proximate an outboard side of the vehicle seat and a deployed configuration in which the airbag is positioned to protect the occupant of the vehicle seat from lateral impact, the airbag comprising a first fabric panel, a second fabric panel attached to the first fabric panel, and a third fabric panel attached to the second fabric panel, wherein the first and second fabric panels define a first inflatable cushion and the second and third fabric panels define a second inflatable cushion; and
   an inflator positioned at least partially within the airbag to deliver inflation gas to the first and second inflatable cushions;
   an inflator adapter tube coupled to the inflator to control inflation gas flow into the second inflatable cushion; and
   a valve coupled to the inflator adapter tube to restrict gas flow from the second inflatable cushion to the first inflatable cushion;
   wherein, in response to delivery of the inflation gas, the airbag transitions from the stowed configuration to the deployed configuration;
   wherein, in the deployed configuration and in response to impingement of the occupant against the airbag, the first inflatable cushion comprises a first pressure and the second inflatable cushion comprises a second pressure greater than the first pressure;
   wherein, in the deployed configuration, the first inflatable cushion is positioned outboard and corresponding generally to the thoracic region of the occupant;
   wherein the second inflatable cushion comprises a substantially C-shape comprising a bottom end region, a central region, and a top end region such that, in the deployed configuration, the second inflatable cushion is positioned outboard of the first inflatable cushion with the top end region being positioned outboard of and corresponding generally to the acromial region of the occupant and extending forward from the seat back, the central portion being positioned outboard of and corresponding generally to the a forward portion of the seat back, and the bottom end region being positioned outboard of and corresponding generally to the coxal region of the occupant and a portion of the seat cushion.

2. The airbag assembly of claim 1, wherein the inflator adapter tube comprises a first end secured to the second fabric panel and a second end defining a gas delivery port disposed within the second inflatable cushion, wherein, during deployment, the gas delivery port is oriented toward an end region of the C-shape to expedite inflation gas flow into the end region.

3. The airbag assembly of claim 1, wherein, in the deployed configuration, the first inflatable cushion is further positioned outboard of and generally corresponding to the acromial region and the coxal region of the occupant.

4. The airbag assembly of claim 1, wherein the first fabric panel and the second fabric panel are stitched together along a generally C-shaped seam that defines a portion of the C-shape.

5. The airbag assembly of claim 4, wherein the assembly comprises a diffuser within the first inflatable cushion, wherein the diffuser comprises a central portion positioned between the inflator and the C-shaped seam to redirect gas flow from the inflator around the C-shaped seam.

6. The airbag assembly of claim 5, wherein the diffuser comprises a first opening that directs inflation gas toward a top end region of the first inflatable cushion and a second opening that directs inflation gas toward a bottom end region of the first inflatable cushion.

7. A method for inflating an airbag disposed in a vehicle seat for providing pressure-appropriate protection during a side impact collision generally for regions corresponding to an acromial region, a thoracic region, and a coxal region of an occupant seated in the vehicle seat, the vehicle seat having a seat cushion and seat back, the method comprising:
    delivering inflation gas into the airbag from an inflator, wherein the airbag comprises a first fabric panel, a second fabric panel attached to the first fabric panel, and a third fabric panel attached to the second fabric panel, wherein the first and second panels define a first inflatable cushion, wherein the second and third panels define a second inflatable cushion comprising a substantially C-shape;
    in response to delivery of the inflation gas into the airbag, transitioning the airbag from a stowed configuration to a deployed configuration;
    passing the inflation gas through an inflator adapter tube within which the inflator is at least partially positioned to control inflation gas flow into the second inflatable cushion; and
    passing the inflation gas through a valve coupled to the inflator adapter tube to restrict gas flow from the second inflatable cushion to the first inflatable cushion;
    wherein transitioning the airbag from the stowed configuration to the deployed configuration comprises expanding the first inflatable cushion such that the first inflatable cushion is positioned outboard of and corresponding generally to the thoracic region of the occupant;
    wherein transitioning the airbag from the stowed configuration to the deployed configuration comprises expanding the second inflatable cushion such that the second inflatable cushion is positioned outboard of and corresponding generally to the acromial region and the coxal region of the occupant;
    wherein, in the deployed configuration and in response to impingement of the occupant against the airbag, the second inflatable cushion comprises a second pressure higher than a first pressure of the first inflatable cushion.

8. The method of claim 7, wherein the inflator adapter tube comprises a first end secured to the second fabric panel and a second end defining a gas delivery port disposed within the second inflatable cushion, wherein expanding the second inflatable cushion comprises orienting the gas delivery port to direct inflation gas into an end region of the C-shape.

9. The method of claim 7, wherein transitioning the airbag from the stowed configuration to the deployed configuration further comprises positioning the first inflatable cushion outboard of and generally corresponding to the acromial region and the coxal region of the occupant, positioning a top end region of the C-shape outboard of and generally corresponding to the acromial region of the occupant, and positioning a bottom end region of the C-shape outboard of and generally corresponding to the coxal region of the occupant.

10. The method of claim 7, wherein the first fabric panel and the second fabric panel are stitched together along a generally C-shaped seam that defines a portion of the C-shape.

11. The method of claim 10, wherein delivering inflation gas into the airbag further comprises passing the inflation gas through a diffuser comprising a central portion positioned between the inflator and the C-shaped seam to redirect gas flow from the inflator around the C-shaped seam.

12. The method of claim 11, wherein passing the inflation gas through the diffuser comprises passing the inflation gas through a first opening of the diffuser that directs inflation gas toward a top end region of the first inflatable cushion and a second opening of the diffuser that directs inflation gas toward a bottom end region of the first inflatable cushion.

13. An airbag assembly for providing pressure-appropriate protection during a side impact collision generally for regions corresponding to an acromial region, a thoracic region, and a coxal region of an occupant seated in a vehicle seat having a seat cushion and seat back, comprising:
    an airbag comprising a stowed configuration in which the airbag is compacted proximate an outboard side of the seat of the vehicle and a deployed configuration in which the airbag is positioned to protect the occupant of the seat from lateral impact, the airbag comprising a first fabric panel, a second fabric panel attached to the first fabric panel, and a third fabric panel attached to the second fabric panel via a C-shaped seam, wherein the second fabric panel comprises an aperture, the first and second fabric panels define a first inflatable cushion, and the second and third fabric panels define a second inflatable cushion having a C-shape defined by the C-shaped seam;
    an inflator positioned at least partially within the airbag to deliver inflation gas to the first and second inflatable cushions;
    an inflator adaptor tube, wherein the inflator is positioned at least partially within the inflator adaptor tube, the inflator adaptor tube comprising a first end positioned to receive inflation gas through the aperture and a second end defining a gas delivery port positioned within the second inflatable cushion;
    a valve coupled to the inflator adapter tube to restrict gas flow from the second inflatable cushion to the first inflatable cushion; and
    a diffuser within the first inflatable cushion, wherein the diffuser comprises a central portion positioned between the inflator and the C-shaped seam to redirect gas flow from the inflator around the C-shaped seam;

wherein, in response to delivery of the inflation gas, the airbag transitions from the stowed configuration to the deployed configuration;

wherein, in the deployed configuration and in response to impingement of the occupant against the airbag, the first inflatable cushion comprises a first pressure and the second inflatable cushion comprises a second pressure greater than the first pressure;

wherein, in the deployed configuration, the first inflatable cushion is positioned outboard of and generally corresponding to the thoracic region of the occupant;

wherein the second inflatable cushion comprises a C-shape such that, in the deployed configuration, the second inflatable cushion is positioned outboard of and generally corresponding to the acromial region and the coxal region of the occupant.

14. The airbag assembly of claim 13, wherein the C-shape comprises a top end region positioned outboard of and generally corresponding to the acromial region of the occupant and a bottom end region positioned outboard of and generally corresponding to the coxal region of the occupant.

15. The airbag assembly of claim 14, wherein the gas delivery port is oriented toward the bottom end region of the C-shape to expedite inflation gas flow into the bottom end region.

16. The airbag assembly of claim 13, wherein, in the deployed configuration, the first inflatable cushion is further positioned outboard of and generally corresponding to the acromial region and the coxal region of the occupant.

17. The airbag assembly of claim 16, wherein the diffuser comprises a first opening that directs inflation gas toward a top end region of the first inflatable cushion and a second opening that directs inflation gas toward a bottom end region of the first inflatable cushion.

18. The airbag assembly of claim 13, wherein the inflator comprises a top portion, a bottom portion, and a central portion encircled by the aperture such that the top portion is positioned within the diffuser and the bottom portion is positioned within the adapter tube.

* * * * *